(12) United States Patent
Thomson

(10) Patent No.: US 10,884,906 B2
(45) Date of Patent: Jan. 5, 2021

(54) GENERATING SCRIPTS THAT FACILITATE EXECUTION OF TASKS WITHIN DIFFERENT RUN-TIME ENVIRONMENTS THAT UTILIZE DIFFERENT LANGUAGES AND SYNTAX

(71) Applicant: GE Aviation Systems LLC, Grand Rapids, MI (US)

(72) Inventor: Scott Thomson, Cheltenham (GB)

(73) Assignee: GE Aviation Systems LLC, Grand Rapids, MI (US)

( * ) Notice: Subject to any disclaimer, the term of this patent is extended or adjusted under 35 U.S.C. 154(b) by 68 days.

(21) Appl. No.: 16/010,882

(22) Filed: Jun. 18, 2018

(65) Prior Publication Data

US 2018/0373620 A1 Dec. 27, 2018

Related U.S. Application Data

(60) Provisional application No. 62/524,233, filed on Jun. 23, 2017.

(51) Int. Cl.
*G06F 11/00* (2006.01)
*G06F 11/36* (2006.01)

(52) U.S. Cl.
CPC ...... *G06F 11/3684* (2013.01); *G06F 11/3664* (2013.01); *G06F 11/3688* (2013.01); *G06F 11/3692* (2013.01)

(58) Field of Classification Search
CPC ............ G06F 11/3684; G06F 11/3664; G06F 11/3688; G06F 11/3692
See application file for complete search history.

(56) References Cited

U.S. PATENT DOCUMENTS 7,913,229 B2 3/2011 Squires et al.
2004/0210874 A1* 10/2004 Kageyama .......... G06F 11/3684
717/124

(Continued)

FOREIGN PATENT DOCUMENTS

KR 10-1219535 B1 1/2013

OTHER PUBLICATIONS

International Search Report and Written Opinion received for PCT Application Serial No. PCT /US2018/039105 dated Sep. 27, 2018, 11 pages.

(Continued)

*Primary Examiner* — Joseph D Manoskey
(74) *Attorney, Agent, or Firm* — Amin, Turocy & Watson, LLP

(57) ABSTRACT

Generation of scripts that facilitate execution of tasks within different run-time environments that utilize different languages and syntax is provided herein. A system comprises a memory that stores executable components and a processor, operatively coupled to the memory, that executes the executable components. The executable components comprise an identification manager component that identifies one or more elements of input data. The input data can comprise test data that comprises respective identifications of an input variable, an output variable, a test vector comprising an initial value of a test input, and an expected output variable against which test results are compared. The executable components can also comprise a template tool component that generates output data that facilitates execution of tasks within different run-time environments that utilize different languages and syntax.

20 Claims, 11 Drawing Sheets

(56) References Cited

U.S. PATENT DOCUMENTS

| | | | |
|---|---|---|---|
| 2004/0225491 A1 | 11/2004 | Chang | |
| 2005/0188271 A1* | 8/2005 | West | G06F 11/3684 |
| | | | 714/38.1 |
| 2007/0028217 A1* | 2/2007 | Mishra | G06F 11/3688 |
| | | | 717/124 |
| 2008/0046868 A1 | 2/2008 | Tsantilis | |
| 2013/0339841 A1* | 12/2013 | Petti | G06F 17/2264 |
| | | | 715/234 |
| 2015/0020051 A1 | 1/2015 | Rabinovitch et al. | |
| 2018/0189168 A1* | 7/2018 | Dwarakanath | G06F 11/3684 |
| 2018/0293157 A1* | 10/2018 | Dougherty | G06F 11/3688 |

OTHER PUBLICATIONS

Communication pursuant to Rules 161(2) and 162 EPC for EP Patent Application Serial No. 18820458.0 dated Jan. 30, 2020, 3 pages.

\* cited by examiner

GENERATING SCRIPTS THAT FACILITATE EXECUTION OF TASKS WITHIN DIFFERENT RUN-TIME ENVIRONMENTS THAT UTILIZE DIFFERENT LANGUAGES AND SYNTAX

CROSS REFERENCE TO RELATED APPLICATIONS

This application claims the benefit of U.S. Provisional Patent Application Ser. No. 62/524,233, filed Jun. 23, 2017, and entitled "GENERATING SCRIPTS THAT FACILITATE EXECUTION OF TASKS WITHIN DIFFERENT RUN-TIME ENVIRONMENTS THAT UTILIZE DIFFERENT LANGUAGES AND SYNTAX", the entirety of which is incorporated herein by reference.

TECHNICAL FIELD

The subject disclosure relates generally to templates that generate tool specific test files from generic test data and, more specifically, to generating scripts that facilitate execution of tasks within different run-time environments that utilize different languages and/or different syntax.

BACKGROUND

Given the large number of different test environments and testing languages available for different purposes, such as testing embedded software for example, there can often be repetition in applying the same tests to multiple environments (e.g., platform environments, computer-programmable languages, and so on). Developing tests with the same objectives for multiple environments can be time consuming and often relies upon being familiar with more than one test environment.

Further, given the long-life span of many projects in various industries, including the aviation industry, particularly with mid-life upgrades, third party test tools used initially might no longer be available when changes are necessary. Thus, the adoption of a new tool and manual re-authorizing of all the test scripts would have to be performed, which is time consuming and can result in errors being made when the test scripts are rewritten.

The above-described deficiencies of test operations are merely intended to provide an overview of some of the problems of current technology and are not intended to be exhaustive. Other problems with the state of the art, and corresponding benefits of some of the various non-limiting embodiments described herein, will become further apparent upon review of the following detailed description.

SUMMARY

The following presents a simplified summary of the disclosed subject matter to provide a basic understanding of some aspects of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

One or more embodiments provide a template language syntax and a template engine that can transform test data according to a template. The disclosed aspects can facilitate the creation of uniformity between different scripting languages or protocols for similar (or the same) data. Accordingly, a same or similar meaning of test data can be determined and translated into a different format for the various test languages that can be utilized with the test data. Therefore, across certain verticals that are using different scripts, the same inputs and desired outputs can be utilized. The disclosed aspects facilitate making the manner of creating scripts for each respective type of language more uniform (or standardized). Thus, if there is the same test data, passed through multiple different templates, the test data can have slightly different scripts targeted for respective languages, each having the same intent. Accordingly, the same test objective can be performed with the use of a same language, a similar language, or a different language to describe the same parameter.

As provided herein, an embodiment relates to a system that can comprise a memory that stores executable components and a processor, operatively coupled to the memory, that executes the executable components. The executable components can comprise an identification manager component that can identify one or more elements of input data. The input data can comprise test data that can comprise respective identifications of an input variable, an output variable, a test vector comprising an initial value of a test input, and an expected output variable against which test results can be compared. The executable components can also comprise a template tool component that can generate output data that can facilitate execution of tasks within different run-time environments that utilize different languages and syntax.

In an example, the output data can comprise one or more scripts that can comprise a generic version of the test data. In another example, the output data can comprise one or more scripts that can be customizable for a defined test environment. In some implementations, the template tool component can generate one or more scripts as the output data and can incorporate respective header information into the one or more scripts.

In accordance with some implementations, the output data can comprise one or more scripts. Further to these implementations, the template tool component can generate a template language syntax that can comprise one or more fields for entry of dynamic data determined as a function of a defined test environment. According to some implementations, the template tool component can determine a section of the test data to be repeated for test steps of the test data.

According to some implementations, the executable components can further comprise a command component that can determine one or more language specific commands for setting at least one input value to a defined value. In accordance with additional, or alternative, implementations, the executable components can further comprise a result determination component that can evaluate a result of an implementation of the test data based on a comparison of the result against the expected output variable.

Another embodiment relates to a method that can comprise identifying, by a system comprising a processor that executes instructions stored in memory, test data. The test data can comprise respective identifications of an input variable, an output variable, a test vector comprising an initial value of a test input, and an expected output variable against which test results can be compared. Further, the method can comprise generating, by the system, one or more scripts. The one or more scripts can facilitate execution of tasks within different run-time environments that utilize different languages and syntax.

In an implementation, the one or more scripts can comprise a generic version of the test data. In some implementations, the one or more scripts can be customizable for a defined test environment or for more than one defined test environment.

According to an example, identifying the test data can comprise receiving the test data in a structured machine-readable format, an unstructured machine-readable format, or combinations thereof. In another example, identifying the test data can comprise identifying at least one of a tolerance, a timing information, a delay information, and a traceability information.

In another example, generating the one or more scripts can comprise incorporating header information into the one or more scripts. According to another example, generating the one or more scripts can comprise generating a template language syntax comprising one or more fields for an entry of dynamic data determined as a function of a defined test environment. In yet another example, generating the one or more scripts can comprise determining a section of the test data determined to be repeated for test steps of the test data.

According to an implementation, the method can comprise determining, by the system, language specific commands for setting an input to a defined value. According to an additional, or alternative, implementation, the method can comprise evaluating, by the system, a result of implementation of the test data. The evaluation can comprise comparing the result of implementation of the test data against the expected output variable.

Another embodiment provided herein relates to a computer readable storage device comprising executable instructions that, in response to execution, cause a system comprising a processor to perform operations. The operations can comprise receiving input data that comprises test data and identifying one or more elements within the test data. The one or more elements can comprise at least one of an input variable, an output variable, a test vector comprising an initial value of a test input, and an expected output variable against which test results can be compared. The operations can also comprise generating output data that comprises one or more commands The one or more commands can facilitate execution of tasks within different run-time environments. Further, the different run-time environments can comprise respective languages and respective syntax.

According to some embodiments, the operations can further comprise receiving a result of an implementation of the output data through a feedback loop and comparing the result of the implementation of the output data against the expected output variable. Further to these embodiments, the operations can also comprise selectively modifying at least one parameter of the test based on the result of the implementation being outside a defined tolerance of the expected output variable.

To the accomplishment of the foregoing and related ends, the disclosed subject matter comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the drawings. It will also be appreciated that the detailed description may include additional or alternative embodiments beyond those described in this summary.

BRIEF DESCRIPTION OF THE DRAWINGS

Various non-limiting embodiments are further described with reference to the accompanying drawings in which.

DETAILED DESCRIPTION

Figure 1:
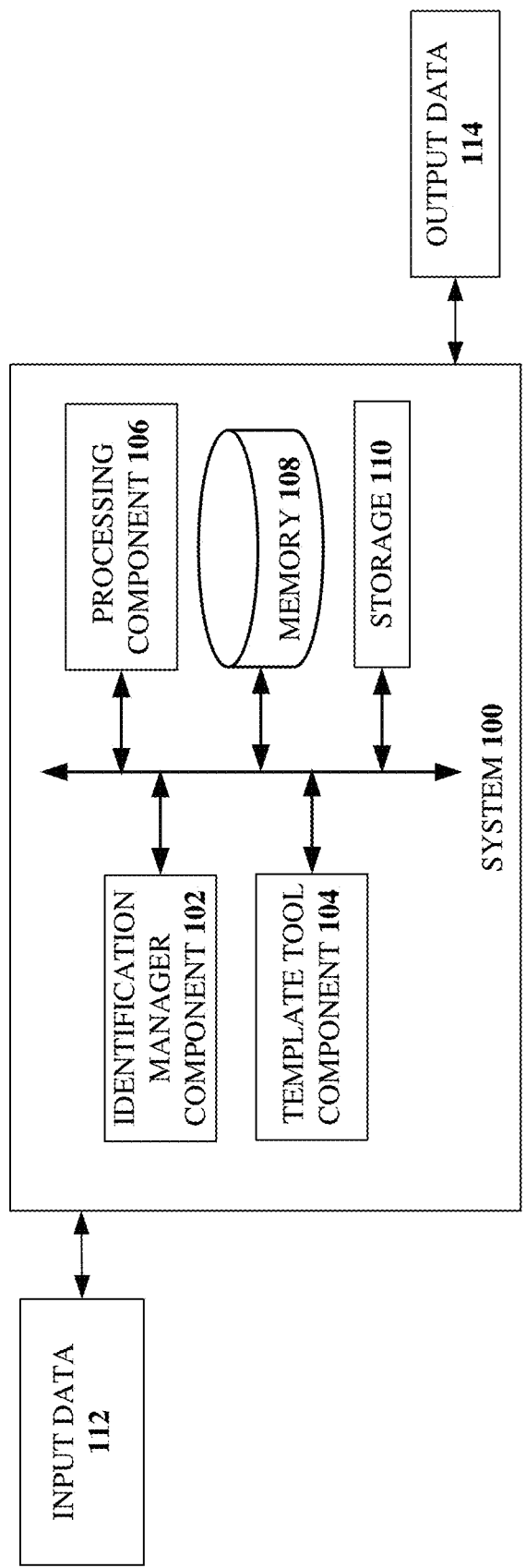
FIG. 1 illustrates an example, non-limiting, system that facilitates the use of templates to generate tool specific test files from generic test data in accordance with one or more embodiments described herein.

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details. In other instances, well-known structures and devices are shown in block diagram form in order to facilitate describing the various embodiments.

Discussed herein are various aspects that can relate to facilitating the use of templates to generate tool specific test files from generic test data. Software tools for testing embedded software can comprise respective languages (e.g., programming languages) and/or set of instructions (e.g., computing instructions) for verifying the behavior of the embedded software. Projects can often use multiple test environments and, therefore, the tests could need to be re-authored in multiple languages. This is not only time consuming but can result in errors during the re-authoring process.

As discussed herein, the various aspects can facilitate representing the objectives of the test in an abstract (e.g., generic) manner that is not specific to one particular tool. Based on this abstraction, the test data can be manipulated by a template engine to the specific syntax of one, two, or many, test languages and/or set of instructions. Verification entities can develop templates that describe the basic structure of a test script with appropriate placeholders for the information to be populated from the test data. Passing a template and test data to the template engine can produce a script in the correct format according to the disclosed embodiments. A script (or scripting language) is a computer language with a series of commands within a file that is capable of being executed without being compiled.

As discussed herein, by abstracting the test data away from one specific tool, concentration can be placed on developing tests to verify the requirements rather than the specific syntax of a potentially unfamiliar language. It is also noted that templates can be developed in specific test languages and the test data can be translated automatically to a script for the specific test language, as provided herein. As utilized herein an "entity," can be one or more computers, the Internet, one or more systems, one or more commercial enterprises, one or more computers, one or more computer programs, one or more machines, machinery, one or more actors, and so forth, hereinafter referred to as an entity or entities depending on the context.

The various aspects provided herein can be a single source of truth. For example, all the test scripts can be based on a single known "good" set of test data. Thus, children test scripts that are created from the single known "good" set of test data are also correct. The disclosed aspects can eliminate errors that can be introduced during manual translation to a new language. Further, the disclosed aspects can facilitate a reduction in effort and utilization of resources. For example, through utilization of the disclosed aspects, there is no longer a need to author, re-author, and/or maintain multiple test scripts. If changes to the test is mandated based on a requirement change or another change, the abstract test data can be updated and the children test scripts can be re-generated through the template engine. Future proofing can also be provided. Test environments develop over time and/or can become superseded by new technology. With the disclosed aspects, a new template can be dynamically developed for a new/updated language and a test script re-generated from the abstract test data.

FIG. 1 illustrates an example, non-limiting, system 100 that facilitates the use of templates to generate tool specific test files from generic test data in accordance with one or more embodiments described herein. Aspects of systems (e.g., the system 100 and the like), apparatuses, or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described.

In various embodiments, the system 100 can be any type of component, machine, device, facility, apparatus, and/or instrument that comprises a processor and/or can be capable of effective and/or operative communication with a wired and/or wireless network. Components, machines, apparatuses, devices, facilities, and/or instrumentalities that can comprise the system 100 can include tablet computing devices, handheld devices, server class computing machines and/or databases, laptop computers, notebook computers, desktop computers, cell phones, smart phones, consumer appliances and/or instrumentation, industrial and/or commercial devices, hand-held devices, digital assistants, multimedia Internet enabled phones, multimedia players, and the like.

The system 100 can employ hardware and/or software to solve problems that are highly technical in nature, that are not abstract and that cannot be performed as a set of mental acts by a human. Further, in certain embodiments, some of the processes performed can be performed by one or more specialized computers (e.g., one or more specialized processing units, a specialized computer with a template tool component, etc.) to carry out defined tasks related to machine learning.

The system 100 and/or components of the system 100 can be employed to solve new problems that arise through advancements in technologies, computer architecture, and/or the like. One or more embodiments of the system 100 can provide technical improvements to computing systems, circuit systems, processor systems, artificial intelligence systems, and/or other systems. One or more embodiments of the system 100 can also provide technical improvements to a processor by improving processing performance of the processor, improving processing efficiency of the processor, improving processing characteristics of the processor, improving the usefulness of data associated with the processor and/or memory, and/or improving power efficiency of the processor and/or memory based on the usefulness of the data.

In the embodiment shown in FIG. 1, the system 100 can comprise an identification manager component 102, a template engine or template tool component 104, a processing component 106, a memory 108, and/or a storage 110. The memory 108 can store computer executable components and instructions. The processing component 106 (e.g., a processor) can facilitate execution of the instructions (e.g., computer executable components and corresponding instructions) by the identification manager component 102, the template tool component 104, and/or other system components. As shown, in some embodiments, one or more of the identification manager component 102, the template tool component 104, the processing component 106, the memory 108, and/or the storage 110 can be electrically, communicatively, and/or operatively coupled to one another to perform one or more functions of the system 100.

The identification manager component 102 can receive input data 112 and can identify one or more elements of the input data 112. The input data 112 can comprise known data, which can be data that has been independently verified and is considered as trusted data. In an example, the input data 112 can comprise one or more templates. The one or more templates can provide information related to a layout and/or data that should be included in an output test script (e.g., output data 114).

In another example, the input data 112 can comprise test data, which can comprise one or more test steps that should be utilized to verify embedded software against one or more defined requirements. For example, the test data can comprise one or more input variables, one or more output variables, or combinations thereof. In another example, the test data can comprise respective names of the input variables and/or the output variables. The input data 112 can also comprise test vectors that specify values to which test inputs should be set. Further, the input data 112 can comprise expected output values against which the tests results (e.g., output data 114) can be compared. The input data 112 can also comprise additional information, such as tolerance data, timing information, delay information, requirements traceability information, and/or other data.

The input data 112 can be a machine-readable description of the one or more templates, the test data, and/or other data. For example, according to some implementations, the input data 112 can be received at the system 100 in a structured machine-readable (e.g., computer-readable) format. However, in some implementations, the input data 112 can be received at the system 100 in an unstructured format that can be interpreted by one or more system components. In some implementations, a first portion of the input data 112 can be received in a structured machine-readable format and a second portion of the input data 112 can be received in an unstructured machine-readable format. Further, the output data 114 can be output from the system 100 in a structured format and/or an unstructured format.

The template tool component 104 can be configured to generate one or more scripts that can comprise a generic version of the test data and/or other input data. The one or more scripts can be can be based on the input data. In some implementations, the one or more scripts can be customizable for a defined test environment. The one or more scripts can be rendered as the output data 114.

In some implementations, the template tool component 104 can generate a template language syntax that can comprise one or more fields for entry of dynamic data determined as a function of a defined test environment. Further, the template tool component 104 can determine a section of the test data to be repeated for test steps of the test data.

According to some implementations, the template tool component 104 can be configured to develop one or more templates for one or more test environments. The one or more templates can be output as the output data 114. For example, the template tool component 104 can determine a first test environment (e.g., based on, at least in part, a first set of data included in the input data 112) and can create one or more templates for the first test environment. Further, the template tool component 104 can determine a second test environment (e.g., based on, at least in part, a second set of data included in the input data 112) and can create one or more templates for the second test environment. The first set of data and the second set of data can comprise the same data, similar data, different data, or combinations thereof. Further, the one or more templates of the first test environment and the one or more templates of the second test environment can comprise the same templates, similar templates, different templates, or combinations thereof.

The one or more templates can include, for example, header information and a template language syntax, which can provide one or more fields in which dynamic data can be inserted. For example, the dynamic data can comprise date/time data, input data source name, tool version number, and other changeable and/or configurable data. Further, the one or more templates can comprise one or more sections that can be repeated for the one or more test steps inside the test data. Further details related to the one or more templates will be provided below with respect to FIGS. 2-5.

It is to be appreciated that the various systems provided herein, including the system 100 (e.g., the identification manager component 102 and/or the template tool component 104, as well as other system components) can perform a test data analysis on input data 112 and/or can generate output data 114 that cannot be performed by a human (e.g., is greater than the capability of a single human mind). For example, an amount of data processed, a speed of data processed, and/or data types of data processed by the system 100 (e.g., the identification manager component 102 and/or the template tool component 104) over a certain period of time can be greater, faster, and different than an amount, speed, and data type that can be processed by a single human mind over the same period of time. The system 100 (e.g., the identification manager component 102 and/or the template tool component 104) can also be fully operational towards performing one or more other functions (e.g., fully powered on, fully executed, etc.) while also performing the above-referenced input data analysis and/or output data generation processes. Moreover, the output data 114 generated and coordinated by the system 100 (e.g., the identification manager component 102 and/or the template tool component 104) can include information that is impossible to obtain manually by a user. For example, a type of information included in the input data 112, a variety of information associated with the input data 112, and/or optimization of the input data 112 to generate and output the one or more output data 114 can be more complex than information that can be obtained manually and processed by a user.

Although illustrated and described with respect to a single memory (e.g., the memory 108) and a single processor (e.g., the processing component 106), the system 100 (and other systems) can comprise more than one memory and/or more than one processor. The memory 108 can be operatively coupled to the processing component 106. Further, the memory 108 can store computer executable components and/or computer executable instructions. The processing component 106 can facilitate execution of the computer executable components and/or the computer executable instructions stored in the memory 108. The term "coupled" or variants thereof can include various communications including, but not limited to, direct communications, indirect communications, wired communications, and/or wireless communications.

Further, the memory 108 can store protocols associated with creating uniformity of different scripting languages and/or or protocols for similar data. For example, the memory 108 can store protocols associated with abstracting data or expressing the data in generic format. Further, the memory 108 can facilitate action to control communication to receive the input data 112 and generate the output data 114, such that the system 100 can employ stored protocols and/or algorithms to achieve generation of one or more scripts and/or other output data as described herein.

It is noted that although the one or more computer executable components and/or computer executable instructions are illustrated and described herein as components and/or instructions separate from the memory 108 (e.g., operatively connected to the memory 108), the various aspects are not limited to this implementation. Instead, in accordance with various implementations, the one or more computer executable components and/or the one or more computer executable instructions can be stored in (or integrated within) the memory 108. Further, while various components and/or instructions have been illustrated as separate components and/or as separate instructions, in some implementations, multiple components and/or multiple instructions can be implemented as a single component or as a single instruction. Further, a single component and/or a single instruction can be implemented as multiple components and/or as multiple instructions without departing from the example embodiments.

It should be appreciated that data store components (e.g., memories) described herein can be either volatile memory or nonvolatile memory, or can include both volatile and nonvolatile memory. By way of example and not limitation, nonvolatile memory can include Read Only Memory (ROM), Programmable ROM (PROM), Electrically Programmable ROM (EPROM), Electrically Erasable ROM (EEPROM), or flash memory. Volatile memory can include Random Access Memory (RAM), which acts as external cache memory. By way of example and not limitation, RAM is available in many forms such as Synchronous RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM), and Direct Rambus RAM (DRRAM). Memory of the disclosed aspects are intended to comprise, without being limited to, these and other suitable types of memory.

The processing component 106 can facilitate respective analysis of information related to test data, input parameters, output parameters, and so on. The processing component 106 can be a processor dedicated to analyzing and/or generating output data 114 based, at least in part, on data received (e.g., the input data 112), a processor that controls one or more components of the system 100, and/or a processor that both analyzes and generates output data 114 based, at least in part, on data received and controls one or more components of the system 100.

Figure 2:
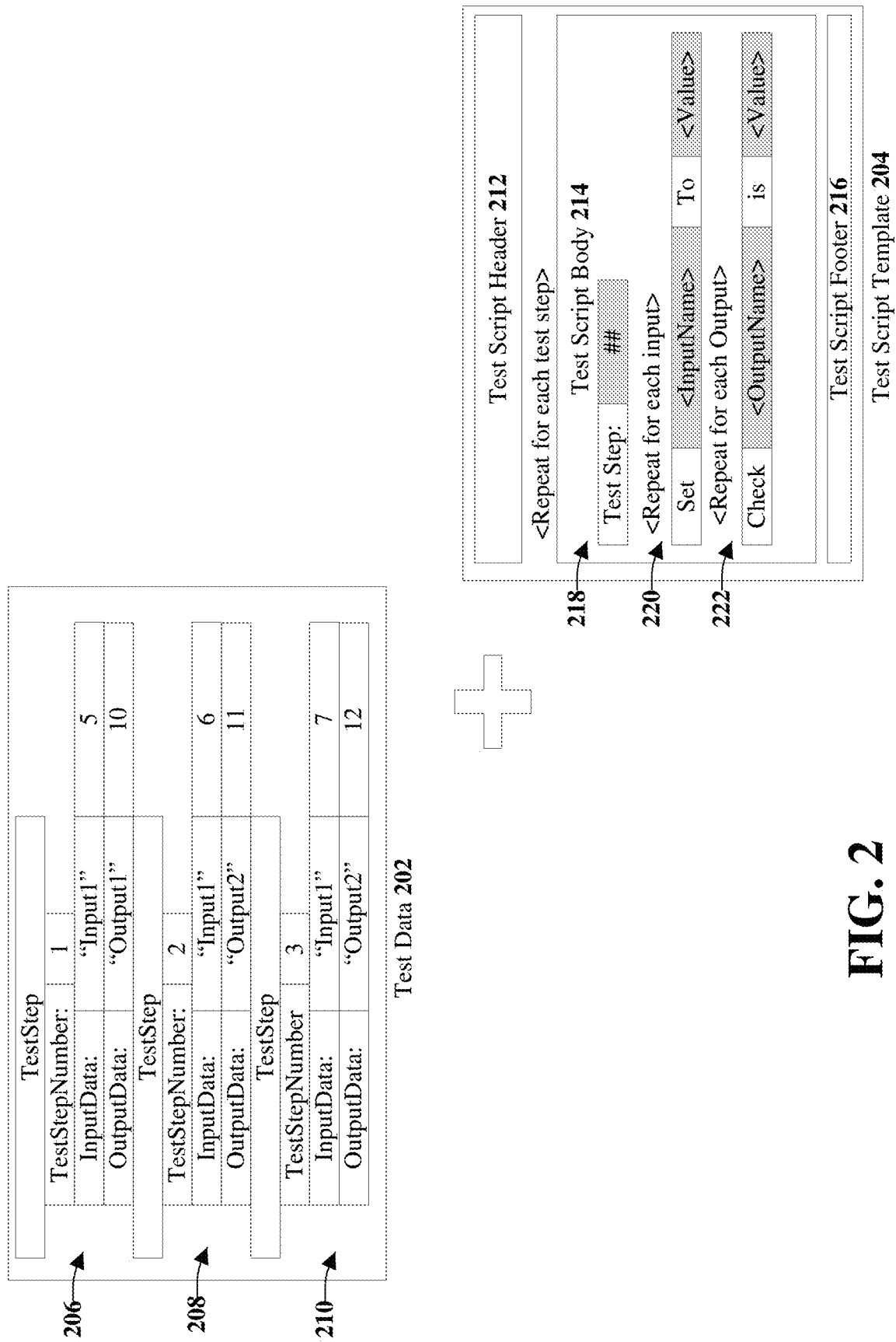
FIG. 2 illustrates example, non-limiting, representations of test data and a test script template in accordance with one or more embodiments described herein.

For purposes of describing the one or more aspects, FIG. 2 illustrates example, non-limiting, representations of test data 202 and a test script template 204 in accordance with one or more embodiments described herein. As illustrated, the test data 202 can comprise one or more test steps, illustrated as a first test step 206 (e.g., TeststepNumber1), a second test step 208 (e.g., TeststepNumber2), and a third test step 210 (e.g., TeststepNumber3). Although three test steps are illustrated and described, other implementations can comprise fewer than three test steps or more than three test steps.

The test steps (e.g., the first test step 206, the second test step 208, the third test step 210) can comprise respective input data and respective output data. For example, the first test step 206 comprises an input data value of "5" and an output data value of "10." The second test step 208 comprises an input data value of "6" and an output data value of "11." Further, the third test step 210 comprises an input data value of "7" and an output data value of "12." It is noted that the input data values and output data values discussed are merely examples and the disclosed aspects are not limited to these specific data values and/or to other specific values provided herein.

The test script template 204 can comprise various sections, which can include, but are not limited to, a test script header 212, a test script body 214, and a test script footer 216. The test script header 212 can comprise various information that can be utilized to describe the test script and/or to provide other information.

The test script body 214 can comprise one or more fields for test step information 218 (e.g., a test step number or other identifier). Also included in the test script body 214 can be fields for input values 220. As illustrated, an input name can be set to a defined value. For example, for the first test step 206, the input name can be set to "Input1" and the value can be set to "5," as indicated in the test data 202. For the second test step 208, the input name can be set to "Input1" and the value can be set to "6," as indicated in the test data 202. Further, for the third test step 210, the input name can be set to "Input1" and the value can be set to "7," as indicated in the test data 202.

The test script body 214 can also comprise an output name and identification of a value for the output, which can be an expected output value that should be checked. In this example, for the first test step 206, the output name can be set to "Output1" and the output value can be set to "10," as indicated in the test data 202. For the second test step 208, the output name can be set to "Output2" and the output value can be set to "11," as indicated in the test data 202. Further, for the third test step 210, the output name can be set to "Output1" and the output value can be set to "12," as indicated in the test data 202.

Figure 3:
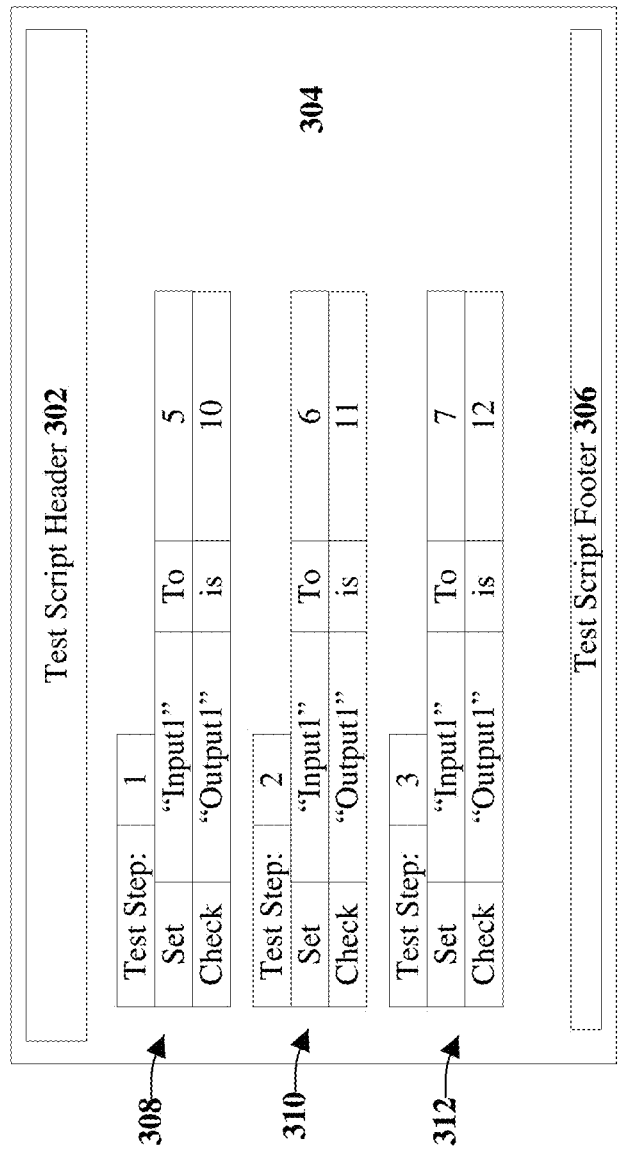
FIG. 3 illustrates an example, non-limiting, representation of a completed test script generated in accordance with one or more embodiments described herein.

FIG. 3 illustrates an example, non-limiting, representation of a completed test script 300 generated in accordance with one or more embodiments described herein. The completed test script 300 can be generated based on the test data 202 and the test script template 204 as discussed with respect to FIG. 2. As illustrated, the completed test script 300 can comprise a test script header 302, a test script body 304, and a test script footer 306.

The test script body 304 can include one or more test steps, illustrated as a first test step 308, a second test step 310, and a third test step 312. The test steps can include respective input values set for each test step and respective output values that were checked. For example, for the first test step 308, the input value was set to 5 and the output value to check is 10. For the second test step 310, the input value was set to 6 and the output value to checks is 11. Further, for the third test step 312, the input value was set to 7 and the output value to check is 12.

If the respective output value checked is determined to be the value expected, or within a defined tolerance range of the expected value, the test was successful. However, if the value is not as expected, or is outside the defined tolerance range, the test was not successful and further action can be taken as will be discussed below with respect to FIG. 7.

Figure 4:
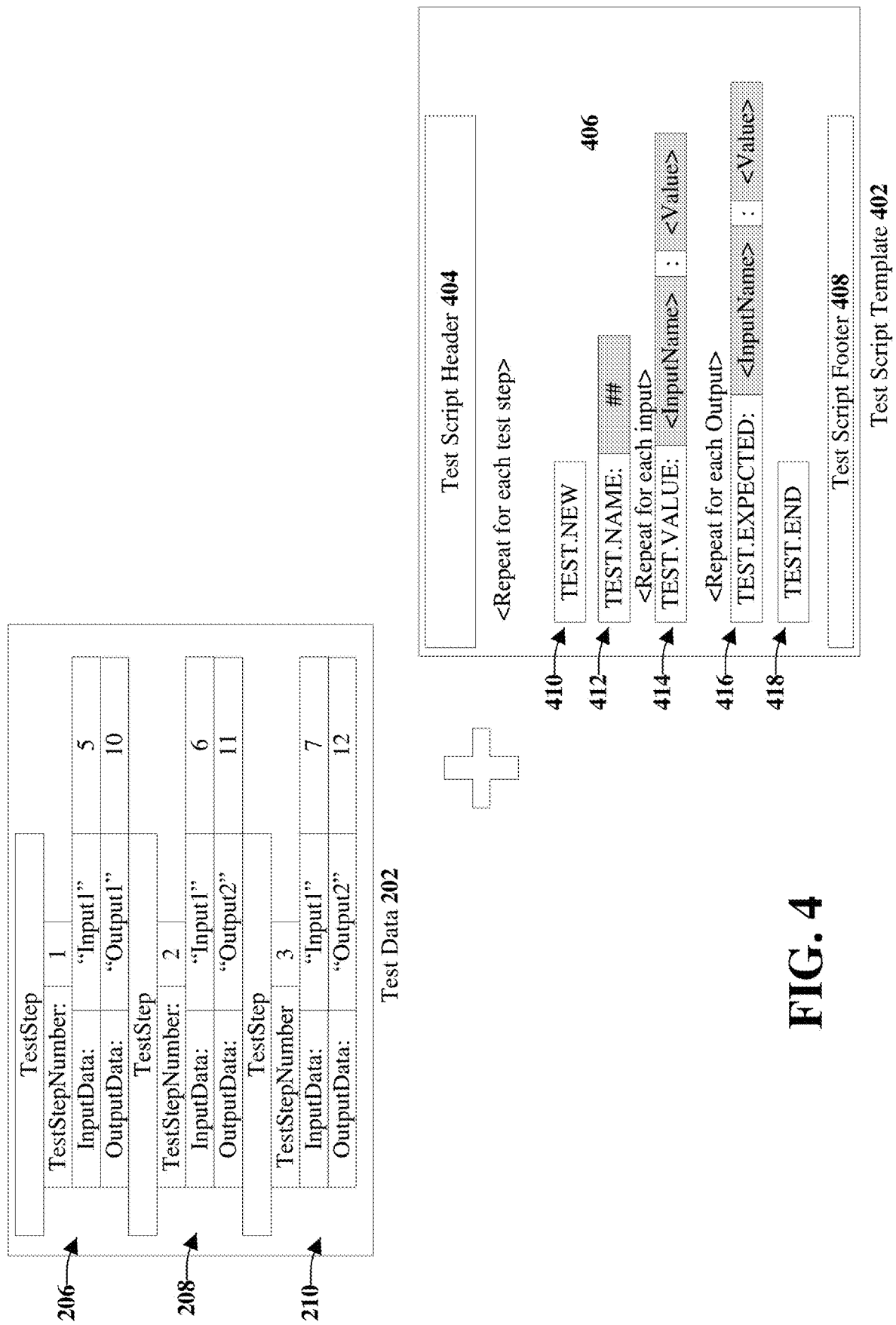
FIG. 4 illustrates example, non-limiting, representations of the test data and another test script template in accordance with one or more embodiments described herein.

FIG. 4 illustrates example, non-limiting, representations of the test data 202 and another test script template 402 in accordance with one or more embodiments described herein. Repetitive description of like elements employed in other embodiments described herein is omitted for sake of brevity. In this example, the test script template 402 comprises a test script header 404, a test script body 406, and a test script footer 408.

The test script body 406 can comprise fields for an indication 410 whether the test is a new test or a repeated test. Also included can be a field for input of a test name 412. Also included in the test script body 406 can be fields for input values 414. As illustrated, an input name can be set to a defined value. For example, for the first test step 206, the input name can be set to "Input1" and the value can be set to "5," as indicated in the test data 202. For the second test step 208, the input name can be set to "Input1" and the value can be set to "6," as indicated in the test data 202. Further, for the third test step 210, the input name can be set to "Input1" and the value can be set to "7," as indicated in the test data 202.

The test script body 406 can also comprise an output name and identification of an expected value for the output. In this example, for the first test step 206, the output name can be set to "Output1" and the output value can be set to "10," as indicated in the test data 202. For the second test step 208, the output name can be set to "Output2" and the output value can be set to "11," as indicated in the test data 202. Further, for the third test step 210, the output name can be set to "Output1" and the output value can be set to "12," as indicated in the test data 202. In an example, if the test is a repeated test, the input of the test name 412 can automatically populate other fields of the test script body 406. An indication of the end of the test 418 can also be include in the test script template 402.

Figure 5:
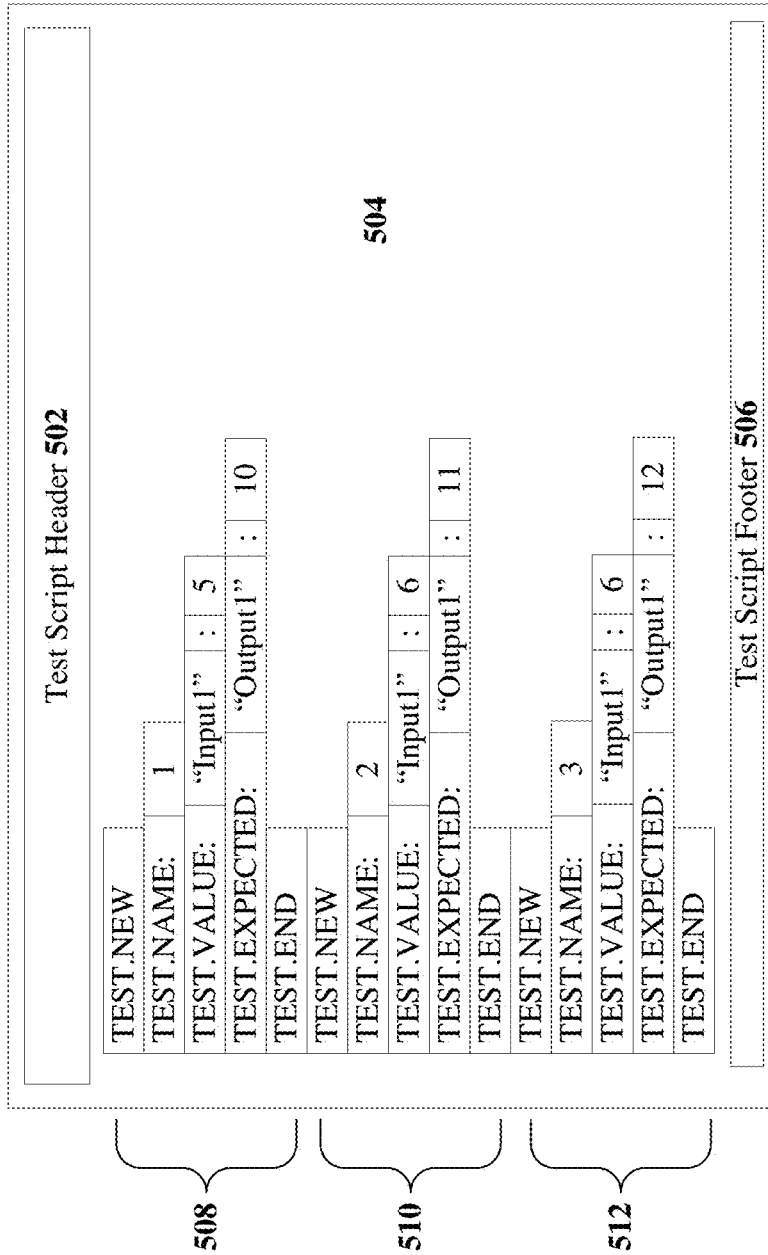
FIG. 5 illustrates another example, non-limiting, representation of a completed test script generated in accordance with one or more embodiments described herein.

FIG. 5 illustrates another example, non-limiting, representation of a completed test script 500 generated in accordance with one or more embodiments described herein. Repetitive description of like elements employed in other embodiments described herein is omitted for sake of brevity.

The completed test script 500 can be generated based on the test data 202 and the test script template 402 of FIG. 4. The completed test script 500 can comprise a test script header 502, a test script body 504, and a test script footer 506. In this example, the test script body 504 can comprise values for different tests being conducted, rather than steps, as illustrated in FIG. 3.

The test script body 504 can include one or more tests, illustrated as a first test 508, a second test 510, and a third test 512. The test steps can include respective input values set for each test step and respective expected output values. For example, for the first test 508, the input value can be 5 and the output value expected can be 10 (e.g., based on the test data 202). For the second test 510, the input value can be 6 and the output value expected can be 11. Further, for the third test 512, the input value can be 7 and the output value expected can be 12. If the output value is as expected, or within a defined tolerance range of the expected value, the test was successful. However, if the value is not as expected, or is outside the defined tolerance range, the test was not successful and further action can be taken as will be discussed below with respect to FIG. 7.

Figure 6:
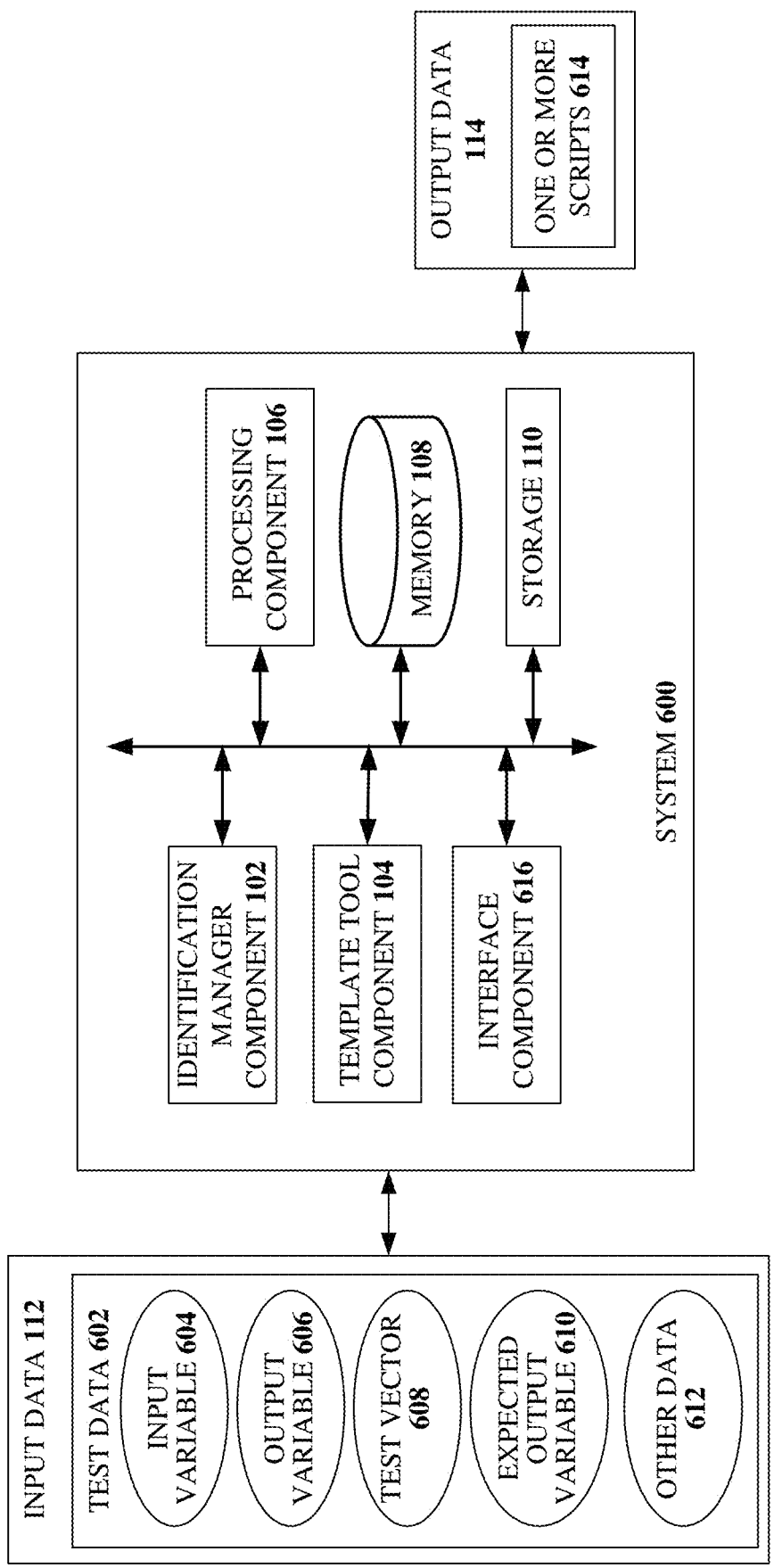
FIG. 6 illustrates an example, non-limiting, system for generating one or more scripts in accordance with one or more embodiments described herein.

FIG. 6 illustrates an example, non-limiting, system 600 for generating one or more scripts in accordance with one or more embodiments described herein. Repetitive description of like elements employed in other embodiments described herein is omitted for sake of brevity.

The system 600 can comprise one or more of the components and/or functionality of the system 100, and vice versa. As discussed herein, scripts are programs written for a special run-time environment that can automate the execution of one or more tasks. When a verification entity (e.g., the system 600 and/or one or more components of the system 600) attempts to create tests for what is being developed, one or more high level objectives can be defined (e.g., an input value should be greater than a defined value, such as, for example, 100, 150, and so on). These "high level" objectives (e.g., input data 112) can be defined as a test objective, which can be included as an objective that should be satisfied at some point within the test script.

There can be multiple tools for writing the test script and each of the tools can comprise its own language and syntax. Therefore, based on the selection of a tool, the test script is generated only in the tool language and only in the manner of writing syntax for satisfying the objective in accordance with the tool. Accordingly, if it is desired to use the test script in a different language, the test script needs to be rewritten for the different language. This is not only time consuming, if it occurs at all (e.g., there can be a lack of incentive to perform the additional work due to costs and expenditure of resources), but it can also be prone to errors during the rewriting (e.g., translation errors, failing to translate one or more portions of the test script, and so on). Accordingly, the various aspects provided herein can dynamically provide the test scripts across different languages, different syntax, and so on.

In an example, the disclosed aspects can be configured to determine that, to satisfy the objective, a single input value (input one) is expected to have an input value that is a number (or other value) greater than a defined value (e.g., if the defined value is 100, the input value should be a number greater than 100, such as, for example, 105). Therefore, based on the input value being greater than the defined value (e.g., 100 in this example), it is expected that the output should be in a particular state. In an example, the state can be "true," "false," or another defined parameter. If the input value does not satisfy the defined value (e.g., is less than 100 in the above example), the output is in a different state. The different state can be a state that is opposite the particular state (e.g., if the particular state is "true," the different state is "false") or is another defined state (e.g., if the particular state is "true," the different state is "repeat value").

According to various aspects, the determination of the expected output value based on the input value can be described in abstract or generic terms. Further, the input value and expected output value data can be included in the test data (e.g., the test data 202), which can be combined with a test template (e.g., the test script template 204, the test script template), as illustrated in FIG. 2 and FIG. 4. The test template can comprise header information (e.g., the test script header 212, the test script header 404) at a top location, a bottom location, or at another location. The body of the script (e.g., the test script body 214, the test script body 406) can repeat for one or more test steps and/or one or more test objectives. For example, a first test can be that the value should be greater than one hundred, a second test can be that the value should be less than one hundred, a third test can be that the value should be exactly one hundred, a fourth test can be that the value should be a maximum defined value, a fifth test can be that the value should be a minimum defined value, and so on.

The identification manager component 102 can identify input data 112 (e.g., test data 602) that can comprise respective identifications of an input variable 604, an output variable 606, a test vector 608, an expected output variable 610, and/or other data 612. The test vector 608 can comprise an initial value of a test input. Further, the expected output variable 610 can be a value against which test results are compared.

In some implementations, the identification manager component 102 can identify in the test data 602 one or more of a tolerance, a timing information, a delay information, and a traceability information. The tolerance information can relate to how precise the output data 114 should be and can be expressed as a value range or based on another type of specification.

In some implementations, the identification manager component 102 can determine that a term is described in a first manner for a first language, and in a second manner for a second language. For example, the first language might call the term "Input 1," and a second language might call the term "Input 15." Accordingly, the identification manager component 102 can perform mapping among the different test languages. Continuing the above example, the identification manager component 102 can label the term ("Term AA") and can cross-reference Term AA with the first language and the second language. The cross-reference can indicate that Term AA corresponds with Input 1 of the first language and with Input 15 of the second language.

Based on the identification by the identification manager component 102, the template tool component 104 can generate one or more scripts 614 (e.g., the output data 114). In an example, the one or more scripts 614 can comprise an abstraction (or generic version) of the test data 602 (e.g., genericized test data). In another example, the one or more scripts 614 can be customizable for a defined test environment. In some implementations, the template tool component 104 can incorporate header information into the one or more scripts 614. Additionally, or alternatively, the template tool component 104 can generate a template language syntax comprising one or more fields for an entry of dynamic data determined as a function of a defined test environment. In some implementations, the template tool component 104 can determine a section of the test data determined to be repeated for test steps of the test data.

The test data 602 and/or the input data 112 can be received by an interface component 616. According to some implementations, the test data 602 and/or the input data 112 can be received at the interface component 616 in a structured machine-readable format. Examples, of structured machine-readable format include, but are not limited to, Extensible Markup Language (XML), a spreadsheet format (e.g., Excel spreadsheet), JavaScript Object Notation (JSON), Resource Description Framework (RDF), and so on. According to some implementations, the test data 602 and/or other input data 112 can be received at the interface component 616 in an unstructured machine-readable format. In some implementations, the test data 202 and/or the input data 112 can be received at the interface component 616 in both the structured machine-readable format and the unstructured machine-readable format. For example, a first portion of the data can be received in the structured machine-readable format and a second portion of the data can be received in the unstructured machine-readable format.

In an implementation, metadata could also be associated with respective inputs (e.g., the input data 112, the test data 602, the input variable 604, the output variable 606, the test vector 608, the expected output variable 610, other data 612, and so on). The metadata can be abstracted (e.g., rendered in generic format) so that the metadata fields and/or metadata tags could be scripted in a variety of languages. This can be performed separately or combined with other inputs (e.g., the input data 112, the test data 602, the input variable 604, the output variable 606, the test vector 608, the expected output variable 610, other data 612, and so on).

The interface component 616 can render the output data 114 (e.g., the one or more scripts 614) in a computer readable format. According to some implementations, the interface component 616 can facilitate a rendering of the output data 114 (e.g., the one or more scripts 614) on respective devices based on one or more requests for implementation of a simulation and/or test as discussed herein. A device can also be called, and can contain, some or all of the functionality of a system, subscriber unit, subscriber station, mobile station, mobile, mobile device, wireless terminal, remote station, remote terminal, access terminal, user terminal, terminal, wireless communication device, wireless communication apparatus, user agent, user device, or user equipment (UE). A device can be a cellular telephone, a cordless telephone, a Session Initiation Protocol (SIP) phone, a smart phone, a feature phone, a Wireless Local Loop (WLL) station, a Personal Digital Assistant (PDA), a laptop, a handheld communication device, a handheld computing device, a netbook, a tablet, a satellite radio, a data card, a wireless modem card, and/or another processing device for communicating over a wireless system. Further, although discussed with respect to wireless devices, the disclosed aspects can also be implemented with wired devices, or with both wired and wireless devices.

The interface component 616 (as well as other interface components discussed herein) can provide, a command line interface, a speech interface, Natural Language text interface, and the like. For example, a Graphical User Interface (GUI) can be rendered that provides an entity with a region or means to load, import, select, read, and so forth, various requests and can include a region to present the results of the various requests. These regions can include known text and/or graphic regions that include dialogue boxes, static controls, drop-down-menus, list boxes, pop-up menus, as edit controls, combo boxes, radio buttons, check boxes, push buttons, graphic boxes, and so on. In addition, utilities to facilitate the conveyance of information, such as vertical and/or horizontal scroll bars for navigation and toolbar buttons to determine whether a region will be viewable, can be employed. Thus, it might be inferred that the entity did want the action performed.

The entity can also interact with the regions to select and provide information through various devices such as a mouse, a roller ball, a keypad, a keyboard, a pen, gestures captured with a camera, a touchscreen, and/or voice activation, for example. According to an aspect, a mechanism, such as a push button or the enter key on the keyboard, can be employed subsequent to entering the information in order to initiate information conveyance. However, it is to be appreciated that the disclosed aspects are not so limited. For example, merely highlighting a check box can initiate information conveyance. In another example, a command line interface can be employed. For example, the command line interface can prompt the entity for information by providing a text message, producing an audio tone, or the like. The entity can then provide suitable information, such as alphanumeric input corresponding to an option provided in the interface prompt or an answer to a question posed in the prompt. It is to be appreciated that the command line interface can be employed in connection with a GUI and/or Application Programming Interface (API). In addition, the command line interface can be employed in connection with hardware (e.g., video cards) and/or displays (e.g., black and white, and Video Graphics Array (VGA)) with limited graphic support, and/or low bandwidth communication channels.

Figure 7:
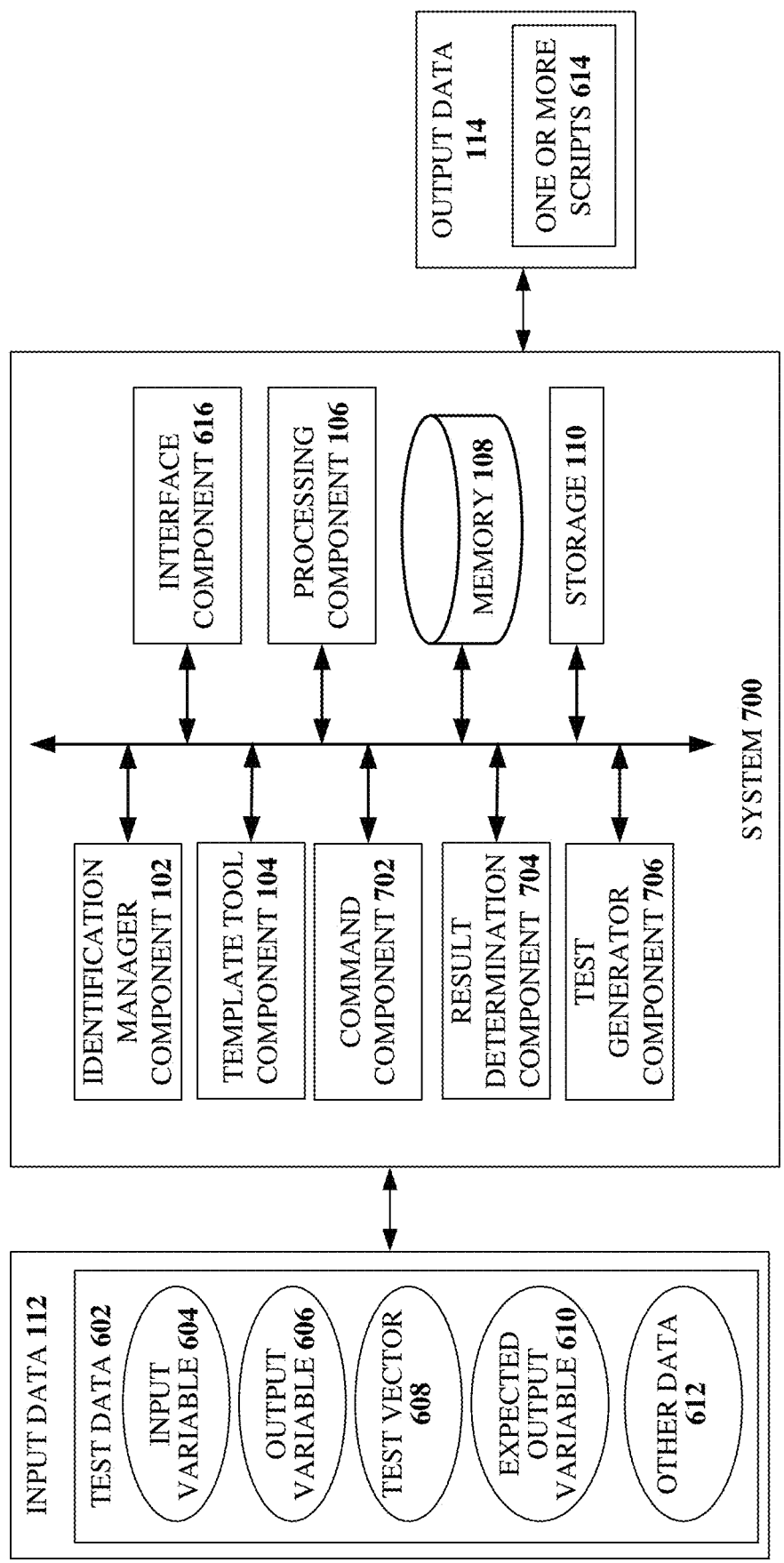
FIG. 7 illustrates an example, non-limiting, system comprising an optional feedback loop for comparison of a result of test data against an expected output variable in accordance with one or more embodiments described herein.

FIG. 7 illustrates an example, non-limiting, system 700 comprising an optional feedback loop for comparison of a result of test data against an expected output variable in accordance with one or more embodiments described herein. Repetitive description of like elements employed in other embodiments described herein is omitted for sake of brevity.

The system 700 can comprise one or more of the components and/or functionality of the system 100, the system 600, and vice versa. A command component 702 can determine language specific commands for setting an input (e.g., the input data 112) to a defined value. For example, the language specific commands can be determined by the command component 702 based on the mapping and/or cross-reference performed by the identification manager component 102.

Further, the system 700 can comprise a result determination component 704 that can evaluate a result of implementation of the output data 114. For example, the result determination component 704 can compare the result obtained through utilization of the output data 114 against an expected output variable (e.g., the expected output variable 610).

For example, the output data 114 can be utilized to execute various programs and/or tests on the system 700 and/or an external system (e.g., a system to which the output data 114 can be provided). A result of execution of various programs and/or tests can be received, at the system 700 (e.g., at the interface component 616), as input data 112. The result determination component 704 can identify information in the result received (e.g., input data 112) and compare the result to a saved expected output variable (e.g., an expected result). If the result matches the expected result (e.g., is at least within a defined tolerance range), the program and/or test operated successfully. However, if the result does not match the expected result (e.g., is outside the defined tolerance range), the program and/or test did not operate successfully and further action can be taken by the system 700 to modify one or more parameters of the test to obtain other output data (e.g., the output data 114), which can be independently verified by the result determination component 704 as discussed herein. For example, the result determination component 704 can determine that a result of the implementations is outside a defined tolerance of the expected output variable and, therefore, at least one parameter of the test can be modified. Further comparisons and/or modifications can be performed until the result of the implementation satisfies the defined tolerance.

As discussed herein, the input data 112 and/or the output data 114 can be written in a structured machine-readable format, an unstructured machine-readable format, or combinations thereof. The input data 112 can describe one or more test steps that could be necessary to verify the embedded software against requirements defined for the embedded software. In an example, the input data 112 can comprise names of input variables and/or output variables, test vectors that can specify the values to which test inputs should be set, and/or expected output values against which the test results can be compared. Additional information such as tolerances, timing/delay information and requirements traceability information, and so on can also be provided.

For each test environment, a template can be developed. The template can include header information such as copyright statements and the template language syntax. Further, the template can provide fields to add dynamic data such as current time/date, input data source name, tool version number, dynamic information, configurable information, and/or combinations thereof.

A main body of the template engine script can contain a section of the template to be repeated for test steps of the one or more test steps inside the test data. This can iterate through writing the appropriate language specific commands to set each input to the correct value and evaluate the result against the expected data. Other fields from the test data can be iterated over inside the template, for example, where multiple inputs are set inside a single test step, the template text can be repeated for each input and the appropriate data is put inside the placeholders. The template language can also support basic data manipulations such as character replacement, conversions between upper and lower case, and external data lookup for environment specific data.

According to some implementations, the disclosed aspects can be deployed without templates and a template engine. In these implementations, a test generator component 706 (e.g., a single test generator tool) can comprise respective algorithms for the different test languages such that the abstract test data can be translated into a defined test language. Alternatively, the test generator component 706 can comprise two or more test generator tools. Respective test generators can be utilized for languages of the different test languages. For example, a first test generator can be utilized for a first test language, a second test generator can be utilized for a second test language, a third test generator can be utilized for a third test language, and so on. Further, in some implementations, a language translator (not shown) can receive a test script targeted for a single test language, the data can be parsed and then re-written in a different language.

The following provides examples for purposes of understanding the disclosed aspects. For the following examples, the term CDI (Common Design Information) is the dictionary that contains language specific information. Further, the term CTP (Common Test Procedure) is the main input source where the test procedure is written in the generic format. This example is of the test data that comprises only three test steps. A real-world test could contain a hundred or more steps and a multitude of other outputs.

```
<?xml version="1.0" encoding="UTF-8" standalone="true"?>
-<TestProcedure FormatVersion="0.7" AtgVersion="0.7"
xmlns="urn:com:ge:atg:dmbl:ctpm">
-<TestStep>
<RequirementId>FMS_FP_LLR-1018</RequirementId>
<TestCaseId>FMS_FP_LLR-1018-TC001</TestCaseId>
<TestStepId>1</TestStepId>
-<InputData>
<SpecificationName>Input1</SpecificationName>
<TestData>5</TestData>
</InputData>
-<InputData>
<SpecificationName>Input2</SpecificationName>
<TestData>5</TestData>
</InputData>
-<OutputData>
<SpecificationName>Output1</SpecificationName>
<TestData>10</TestData>
</OutputData>
</TestStep>
-<TestStep>
<RequirementId>FMS_FP_LLR-1018</RequirementId>
<TestCaseId>FMS_FP_LLR-1018-TC002</TestCaseId>
<TestStepId>2</TestStepId>
-<InputData>
<SpecificationName>Input1</SpecificationName>
<TestData>50</TestData>
</InputData>
-<InputData>
<SpecificationName>Input2</SpecificationName>
<TestData>50</TestData>
</InputData>
-<OutputData>
<SpecificationName>Output1</SpecificationName>
<TestData>100</TestData>
</OutputData>
</TestStep>
-<TestStep>
<RequirementId>FMS_FP_LLR-1018</RequirementId>
<TestCaseId>FMS_FP_LLR-1018-TC003</TestCaseId>
<TestStepId>3</TestStepId>
-<InputData>
<SpecificationName>Input1</SpecificationName>
<TestData>-50</TestData>
</InputData>
-<InputData>
<SpecificationName>Input2</SpecificationName>
<TestData>50</TestData>
</InputData>
-<OutputData>
<SpecificationName>Output1</SpecificationName>
<TestData>0</TestData>
</OutputData>
</TestStep>
</TestProcedure>
```

The following is an example, non-limiting template based on the language for an automated testing software in accordance with one or more embodiments provided herein. It is noted that for the following examples, the 'keywords' surrounded by {{}} are the points where data is dynamically added. The header contains some metadata about the script and the date, which input files were used, tool versions numbers, and other information can be added. The expression {{foreach:TestStep}} iterates over each test step inside the TestData. Further, the expression {{SpecificationName}} is a word replacement where the value of the current input/output can be added in place of the keyword.

```
{ {extension:ada} }
--
-- FileName: { {SourceCTP} } .ada
-- Generated On: { {Date:yyyy/MM/dd hh:mm} }
-- Source Test Procedure: { {SourceCTP} } .xml
-- Generated by: ASSERT ATPT { {version} }
--
-- Copyright { {Date:yyyy} } Company Name
--
begin
{ {foreach:TestStep} }
-- { {TestCaseId} }: { {TestStepId} }
{ {foreach:InputData} }
{ {SpecificationName} } := { {TestData} } ;
{ {/foreach} }
{ {foreach:OutputData} }
TestConductor.ASSERT_NAME( { {SpecificationName} }=
{ {TestData} } ) ;
{ {/foreach} }
{ {/foreach} }
end;
```

The following is an example, non-limiting, result of running (e.g., executing) the translation using the example template language specification (provided below) and the above example template based on the language for the automated testing software in accordance with one or more embodiments provided herein.

```
-
-- FileName: ExampleTestData.ada
-- Generated On: 2017/06/23 06:39
-- Source Test Procedure: ExampleTestData.xml
-- Generated by: ASSERT ATPT 1.1
--
-- Copyright 2017 Company Name
--
begin
-- FMS_FP_LLR-1018-TC001: 1
Input1 := 5;
Input2 := 5;
TestConductor.ASSERT_NAME(Output1=10) ;
-- FMS_FP_LLR-1018-TC002: 2
Input1 := 50;
Input2 := 50;
TestConductor.ASSERT NAME(Output1=100) ;
-- FMS FP_LLR-1018-TC003: 3
Input1 := −50;
Input2 := 50;
TestConductor.ASSERT_NAME(Output1=0) ;
end;
```

The following is another example, non-limiting template based on the language for another automated testing software in accordance with one or more embodiments provided herein.

```
{ {extension:tst} }
--
-- FileName: { {SourceCTP} }.tst
-- Generated On: { {Date:yyyy/MM/dd hh:mm} }
-- Source Test Procedure: { {SourceCTP} } .xml
-- Generated by: ASSERT ATPT { {version} }
--
-- Copyright { {Date:yyyy} } Company Name
--
```

```
{ {foreach:TestStep} }
-- Test Step { {TestStepId} } - Test Case: { {TestCaseId} }
TEST.NAME:{ {TestCaseId} }-{ {TestStepId} }
{ {foreach:InputData} }
TEST.VALUE:{ {SpecificationName} } : { {TestData} }
{ {/foreach} }
{ {foreach:OutputData} }
TEST.EXPECTED:{ {SpecificationName} } : { {TestData} }
{ {/foreach} }
TEST.END
{ {/foreach} }
-- Script End
```

The following is an example, non-limiting, result of running (e.g., executing) the translation using the example template language specification (provided below) and the above example template based on the language for the another automated testing software in accordance with one or more embodiments provided herein.

```
--
-- FileName: ExampleTestData.tst
-- Generated On: 2017/06/23 06:39
-- Source Test Procedure: ExampleTestData.xml
-- Generated by: ASSERT ATPT 1.1
--
-- Copyright 2017 Company Name
--
-- Test Step 1 - Test Case: FMS_FP_LLR-1018-TC001
TEST.NAME:FMS_FP_LLR-1018-TC001-1
TEST.VALUE:Input1:5
TEST.VALUE:Input2:5
TEST.EXPECTED:Output1:10
TEST.END
-- Test Step 2 - Test Case: FMS_FP_LLR-1018-TC002
TEST.NAME:FMS_FP_LLR-1018-TC002-2
TEST.VALUE:Input1:50
TEST.VALUE:Input2:50
TEST.EXPECTED:Output1:100
TEST.END
-- Test Step 3 - Test Case: FMS_FP_LLR-1018-TC003
TEST.NAME:FMS_FP_LLR-1018-TC003-3
TEST.VALUE:Input1:−50
TEST.VALUE:Input2:50
TEST.EXPECTED:Output1:0
TEST.END
-- Script End
```

For purposes of explanation and not limitation, the following describes example, non-limiting, template language specification. Specifically, the following provides example descriptions of the basic syntax that can be utilized according to some implementations. It is noted that the examples provided herein do not cover usage of all of the basic syntax, such as {{Lookup}} which can be used to look up data specific to the test environment. For example, Input1 can be called Test.Input.Input1 in the test environment language.

For the example, non-limiting, template language specification, the following keywords can be utilized:

```
Extension — { {extension:<value> } }
SourceCTP — { {SourceCTP} }
SourceCDI — { {SourceCDI} }
Version — { {version} }
Date — { {Date:<format>} }
If — { {if:<condition> } }
End If — { {/if} }
Foreach — { {foreach:<nodeName>[:<delimeter>]} }
End Foreach — { {/foreach } }
Lookup — { {Lookup:<localNode>:<foreignNode>:<desiredNode>} }
Word Replacement — { {<nodeName>} }
Character and String Replacement —
    { {CharReplace:<nodeName>:<stringToReplace>:<substituteString>} }
```

Further, for the example, non-limiting, template language specification, the following word modifiers can be utilized:

```
Upper — { {<nodeName>|upper} }
Lower — { {<nodeName>|lower} }
Title — { {<nodeName>|title} }
Bool — { {<nodeName>|bool} }/ { {<nodeName>|boolean} }
```

In addition, other language constructs that can be utilized, for the example, non-limiting, template language specification, can include the following:

```
Scope Specification — { {<CDI/CTP>-><nodeName>} }
XML Attribute — { {<nodeName>.<attribute>} }
```

As an introduction, the ATPT template files can use a pseudo-language with a few key words to allow the manipulation of data from either the CDI, CTP, or the template file itself. Keywords that should be interpreted by the ATPT tool can be marked by surrounding them with double curly braces as follows:

{{}}
{{}}

Anything not surrounded by curly braces can be parsed as plain text. However, this does not mean the test is ignored. Instead, the if and for each keywords can either ignore certain text or repeat it respectively.

The following provides details related to the keywords that can be utilized.

Extension—{{extension:<value>}}: Example: {{extension:txt}}. This can determine the file extension for the output generated by the ATPT tool. It could be standard to have this value set as the first line of the template, however it acts as metadata and so can be placed anywhere in the file without affecting the textual output of the file. If contained multiple times in the file, then the last executed line can be used. If not present in the file, .txt can be used by default and a warning can be written to the log file.

SourceCTP—{{SourceCTP}}: Example: {{sourceCTP}}. This is one of the fixed replacement keywords; it can be replaced with the name of the CTP file.

SourecCDI—{{SourceCDI}}: Example: {{sourceCDI}}. This is one of the fixed replacements keywords; it is replaced with the name of the CDI file.

Version—{{version}}: Example: {{version}}. This is one of the fixed replacements keywords. It is replaced with the version number of the ATPT tool.

Date—{{Date:<format>}}: Example: {{Date: yyyy MM dd hh:mm}}. Date replaces this keyword with the date at the time of generation in the format provided, the format is separated from the Date keyword with a colon. However, any colons after this are ignored, allowing the inclusion of it in the format string. The format string is passed into C#'s.

If—{{if:<condition>}}: Example: {{if:direction==in}}. The If keyword evaluates the condition and if it evaluates to true then the ATPT tool executes the lines between the if keyword and the end if keyword (see below). The condition allows the following operators.

== Returns true if the two values are equal
\> Returns true if the first operand is greater than the second
< Returns true if the first operand is less than the second
\>= Returns true if the first operand is greater than or equal to the second
<= Returns true if the first operand is less than or equal to the second
!= Returns true if the two values are not equal The two values being compared are searched for in the CDI and CTP files, if they are found then the value is replaced for comparison, otherwise it is used as a literal string comparison.

End If—{{/if}}: Example: {{/if}}. Ends a block of executable text for an if statement.

Foreach—{{foreach:<nodeName>[:<delimeter>]}}: Example: {{foreach:TestStep}} {{foreach:InputData:,}}. The foreach keyword repeats each line in the template between the foreach and the end foreach (see below) for each node name provided in the CDI or CTP file.

Any replacements or XML lookups done inside the executed for each loop will be done with consideration to the node's scope. For example, in the following XML;

```
<ComponentName>LS</ComponentName>
<SubComponentName>Is_LNAV_Valid</SubComponentName>
<TestStep>
<RequirementId>HLR_340</RequirementId>
<TestStepId>HLR_340_instance_0_TestObjectiveModel1_ts_1</TestStepId>
<TestCaseId>HLR_340_instance_0_TestObjectiveModel1</TestCaseId>
<Timing/>
<InputData>
<SpecificationName> SpecName _1</SpecificationName>
```

```
    <DesignName>LNAV_TO_Capable</DesignName>
    <TestData>1</TestData>
</InputData>
<InputData>
    <SpecificationName> SpecName _2</SpecificationName>
    <DesignName>Ref Path_Available</DesignName>
    <TestData>1</TestData>
</InputData>
<OutputData>
    <SpecificationName> SpecName _3</SpecificationName>
    <DesignName>LNAV_Valid</DesignName>
    <TestData/>
    <Tolerance/>
</OutputData>
</TestStep>
```

If the foreach loop is executing lines for each InputData then the scope will be limited to the XML lines between the <InputData> and </InputData> tag, so the first run through the loop will look in:

```
<SpecificationName>SpecName</SpecificationName>
<DesignName>LNAV_TO_Capable</DesignName>
<TestData>1</TestData>
``` first, and then if it cannot be found, it will look at the remainder of the XML file. his means foreach loops can be written that will do the following:

```
{ {foreach:InputData} }
TEST.VALUE:DesignName:TestData
{ {foreach} }
``` and not have to specify which DesignName value is used. Foreach loops can be nested, and can be done on a single line, however they cannot be nested on the same line, for example;
{{foreach:InputData DesignName /foreach}}
and

```
{ {foreach:TestStep} }
{ {foreach:InputData} }
{ {DesignName} }
{ {/foreach} }
{ {/foreach} }
``` can be allowed.

```
{ {foreach:TestStep} } { {foreach:InputData} }
{ {DesignName} } { /{foreach} }
{ {/foreach} }
```

The final optional argument for the foreach loop is the delimiter to be put between the entries of the executed foreach.

End Foreach—{{/foreach}}: Example: {{/foreach}}. Marks the end of the text to be executed as part of the last foreach loop on the stack Lookup—{{Lookup:<localNode>:<foreignNode>:<desiredNode>}}. Example: {{Lookup:SpecificationName:TED->ontologyVariableName:TED->testVariableName}}. Allows cross XML lookup by linking two nodes with the same value, the command finds a node with the name <foreignNode> that matches the value of <localNode> and then in <foreignNode>'s scope, it returns the value of <desiredNode>

Word Replacement—{{<nodeName>}}: Example: {{DesignName}}. The word replacement command looks through first the current scope, then the CTP, and finally the CDI, and if it cannot be found it simply leaves the word as is.

Character and String Replacement—{CharReplace:<nodeName>:<stringToReplace>:<substitute String>}}: Example: {{CharReplace:Test-1-2-3:-:_}}. CharReplace takes a node and replaces any instances of stringToReplace with substituteString. Multiple CharReplace commands can be used on the same line, but they cannot be nested. In the above example, Test-1-2-3 becomes Test_1_2_3.

The following provides details related to the word modifiers that can be utilized.

Upper—{{<nodeName>|upper}}: Example: {{variable|upper}}. This modifier changes the returned word to be entirely uppercase.

Lower—{{<nodeName>|lower}}: Example: {{variable|lower}}. This modifier changes the returned word to be entirely lowercase.

Title—{{<nodeName>|title}}: Example: {{variable|title}}. This modifier changes the returned word to be in title case, where the first letter is uppercase and the rest are lower. According to some implementations, this does not take into account subsequent words. However, according to other implementations, this does take into account subsequent words.

Bool—{{<nodeName>|bool}}/{{<nodeName>|boolean}}: Example: {{1|bool}}. This modifier changes the returned value to C#'s defined boolean true/false string depending on its value. If the value is 1, or any capitalization of the true string, it will return "True", if it is 0 or any capitalization of the false string, it will return "False". ATPT compares the value directly with C#'s defined boolean true/false string. For example; "true", "True", "TRUE", "tRuE", "1", "1", would all return "True". If the value can not be converted, it is simply returned as-is.

The following provides details related to the other language constructs that can be utilized.

Scope Specification—{{<CDI/CTP>-><nodeName>}}: Example: {{CDI->variable}} {{CTP->variable}}. This modifier specifies which scope ATPT should look for the node, either the CTP or CDI file contents.

XML Attribute—{{<nodeName>.<attribute>}}: Example: {{subComponent.name}}. This modifier specifies to ATPT to grab the value of that xml attribute as opposed to the node name itself.

Figure 8:
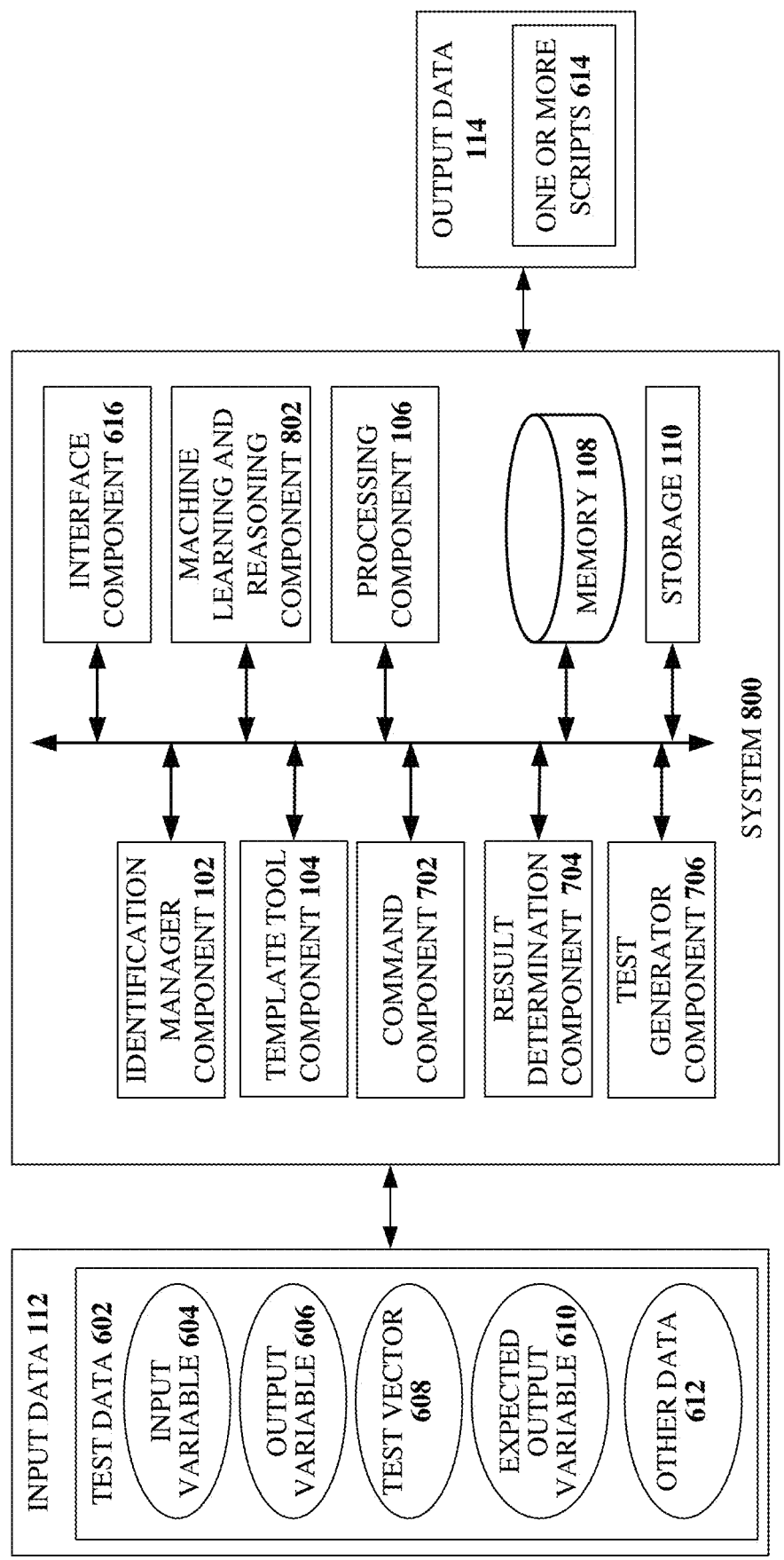
FIG. 8 illustrates an example, non-limiting, system that employs machine learning to automate creation of templates in accordance with one or more embodiments described herein.

FIG. 8 illustrates an example, non-limiting, system 800 that employs machine learning to automate creation of templates in accordance with one or more embodiments described herein. Repetitive description of like elements employed in other embodiments described herein is omitted for sake of brevity. The system 800 can comprise one or more of the components and/or functionality of the system 100, the system 600, the system 700, and vice versa.

The system 800 can include a machine learning and reasoning component 802, which can be utilized to automate one or more of the disclosed aspects. The machine learning and reasoning component 802 can understand n number of languages, where n is an integer greater than or equal to one. The machine learning and reasoning component 802 can take a script with the inputs and outputs and, using the template editors, can automatically create similar scripts in different languages. In some implementations, the machine learning and reasoning component 802 can perform translation from a first language directory into a second language directory, as well as subsequent language directories.

The machine learning and reasoning component 802 can employ automated learning and reasoning procedures (e.g., the use of explicitly and/or implicitly trained statistical classifiers) in connection with performing inference and/or probabilistic determinations and/or statistically-based determinations in accordance with one or more aspects described herein.

For example, the machine learning and reasoning component 802 can employ principles of probabilistic and decision theoretic inference. Additionally, or alternatively, the machine learning and reasoning component 802 can rely on predictive models constructed using machine learning and/or automated learning procedures. Logic-centric inference can also be employed separately or in conjunction with probabilistic methods.

The machine learning and reasoning component 802 can infer, for one or more output parameters of interest (e.g., an expected output variable), one or more input variables and/or one or more input parameters that correspond to the output parameters of interest. Based on this knowledge, the machine learning and reasoning component 802 can make an inference based on taking the same meaning, or a similar meaning, from the test data and translating the meaning into a different format for a variety of test languages.

As used herein, the term "inference" refers generally to the process of reasoning about or inferring states of the system, a component, a module, the environment, and/or test data from a set of observations as captured through events, reports, data, and/or through other forms of communication. Inference can be employed to identify a specific context or action, or can generate a probability distribution over states, for example. The inference can be probabilistic. For example, computation of a probability distribution over states of interest based on a consideration of data and/or events. The inference can also refer to techniques employed for composing higher-level events from a set of events and/or data. Such inference can result in the construction of new events and/or actions from a set of observed events and/or stored event data, whether or not the events are correlated in close temporal proximity, and whether the events and/or data come from one or several events and/or data sources. Various classification schemes and/or systems (e.g., support vector machines, neural networks, logic-centric production systems, Bayesian belief networks, fuzzy logic, data fusion engines, and so on) can be employed in connection with performing automatic and/or inferred action in connection with the disclosed aspects.

The various aspects, for example, in connection with producing one or more scripts for defined test data can employ various artificial intelligence-based schemes for carrying out various aspects thereof. For example, a process for determining if a first term in a first language is comparable to a second term in a second language, can be enabled through an automatic classifier system and process.

A classifier is a function that maps an input attribute vector, $x=(x1, x2, x3, x4, xn)$, to a confidence that the input belongs to a class. In other words, $f(x)=confidence(class)$. Such classification can employ a probabilistic and/or statistically-based analysis (e.g., factoring into the analysis utilities and costs) to prognose or infer an action that should be employed to determine how to create one or more scripts that can be utilized across different language and syntax formats.

A Support Vector Machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that can be similar, but not necessarily identical to training data. Other directed and undirected model classification approaches (e.g., naïve Bayes, Bayesian networks, decision trees, neural networks, fuzzy logic models, and probabilistic classification models) providing different patterns of independence can be employed. Classification as used herein, can be inclusive of statistical regression that is utilized to develop models of priority.

One or more aspects can employ classifiers that are explicitly trained (e.g., through a generic training data) as well as classifiers that are implicitly trained (e.g., by observing and recording test data behavior, by receiving extrinsic information, and so on). For example, SVM's can be configured through a learning or training phase within a classifier constructor and feature selection module. Thus, a classifier(s) can be used to automatically learn and perform a number of functions, including but not limited to determining, according to a predetermined criteria, identification of various input parameters, identification of various output parameters, and so forth. The criteria can include, but is not limited to, similar terms, related information, and so forth.

Additionally, or alternatively, an implementation scheme (e.g., a rule, a policy, and so on) can be applied to control and/or regulate script simplification and resulting actions, and so forth. In some implementations, based upon a predefined criterion, the rules-based implementation can automatically and/or dynamically interpret test data. In response thereto, the rule-based implementation can automatically interpret and carry out functions associated with the generation of one or more scripts by employing a predefined and/or programmed rule(s) based upon any desired criteria.

Methods that can be implemented in accordance with the disclosed subject matter, will be better appreciated with reference to the following flow charts. While, for purposes of simplicity of explanation, the methods are shown and described as a series of blocks, it is to be understood and appreciated that the disclosed aspects are not limited by the number or order of blocks, as some blocks can occur in different orders and/or at substantially the same time with other blocks from what is depicted and described herein. Moreover, not all illustrated blocks can be required to implement the disclosed methods. It is to be appreciated that the functionality associated with the blocks can be implemented by software, hardware, a combination thereof, or any other suitable means (e.g. device, system, process, component, and so forth). Additionally, it should be further appreciated that the disclosed methods are capable of being stored on an article of manufacture to facilitate transporting and transferring such methods to various devices. Those skilled in the art will understand and appreciate that the methods could alternatively be represented as a series of interrelated states or events, such as in a state diagram. According to some implementations, a machine-readable storage medium, comprising executable instructions that, when executed by a processor, facilitate performance of the methods. According to other implementations, a non-transitory computer-readable medium, comprising executable instructions that, when executed by a processor, facilitate performance of the methods.

Figure 9:
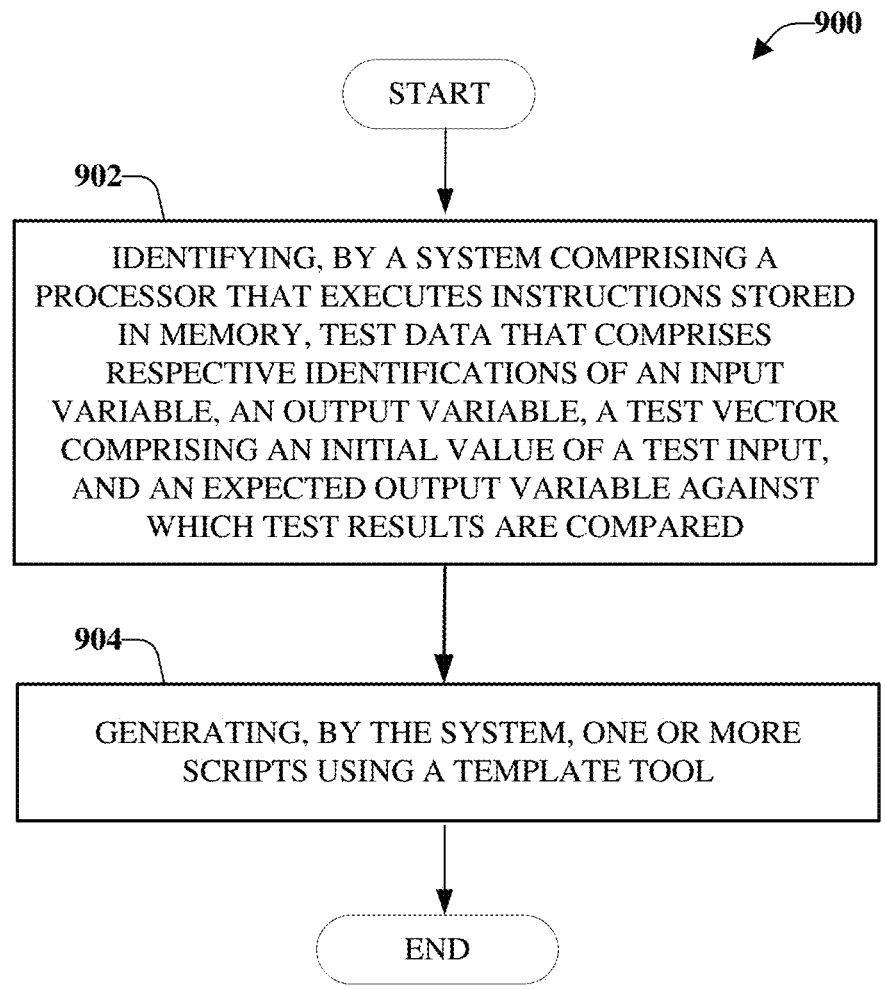
FIG. 9 illustrates an example, non-limiting, computer-implemented method for generating one or more scripts for execution within different run-time environments that utilize different languages and syntax in accordance with one or more embodiments described herein.

FIG. 9 illustrates an example, non-limiting, computer-implemented method 900 for generating one or more scripts for execution within different run-time environments that utilize different languages and syntax in accordance with one or more embodiments described herein. Repetitive description of like elements employed in other embodiments described herein is omitted for sake of brevity.

At 902 of the computer-implemented method 900, test data can be identified (e.g., via the identification manager component 102). The test data can comprise respective identifications of an input variable, an output variable, a test vector comprising an initial value of a test input, and/or an expected output variable against which test results are compared.

Identification of the test data can be performed dynamically. In an example, identifying the test data can comprise receiving the test data from an internal source and/or an external source. The test data can be received in a structured machine-readable format according to some implementations. In another example, identifying the test data can comprise identifying at least one of a tolerance, a timing information, a delay information, and a traceability information.

At 904 of the computer-implemented method 900, one or more scripts can be generated (e.g., via the template tool component 104). The one or more scripts can be utilized to facilitate execution of tasks within different run-time environments that utilize different languages and syntax. According to an implementation, the one or more scripts can comprise an abstraction (e.g., a generic version) of the test data. In some implementations, the one or more scripts can be customizable for a defined test environment.

In an example, generating the one or more scripts can comprise incorporating header information into the one or more scripts. In an additional or alternative example, generating the one or more scripts can comprise generating a template language syntax comprising one or more fields for an entry of dynamic data determined as a function of a defined test environment. Additionally, or alternatively, generating the one or more scripts can comprise determining a section of the test data determined to be repeated for test steps of the test data.

According to an implementation, the computer-implemented method 900 can include determining language specific commands for setting an input to a defined value. Further to this implementation, the computer-implemented method 900 can include evaluating a result of implementation of the test data, wherein the evaluating comprises comparing the result against the expected output variable.

In some implementations, the computer-implemented method 900 can comprise receiving a result of an implementation of the output data through a feedback loop. The computer-implemented method 900 can also comprise comparing the result of the implementation of the output data against the expected output variable. Further, according to these implementations, the computer-implemented method 900 can comprise selectively modifying at least one parameter of the test based on the result of the implementation being outside a defined tolerance of the expected output variable.

Figure 10:
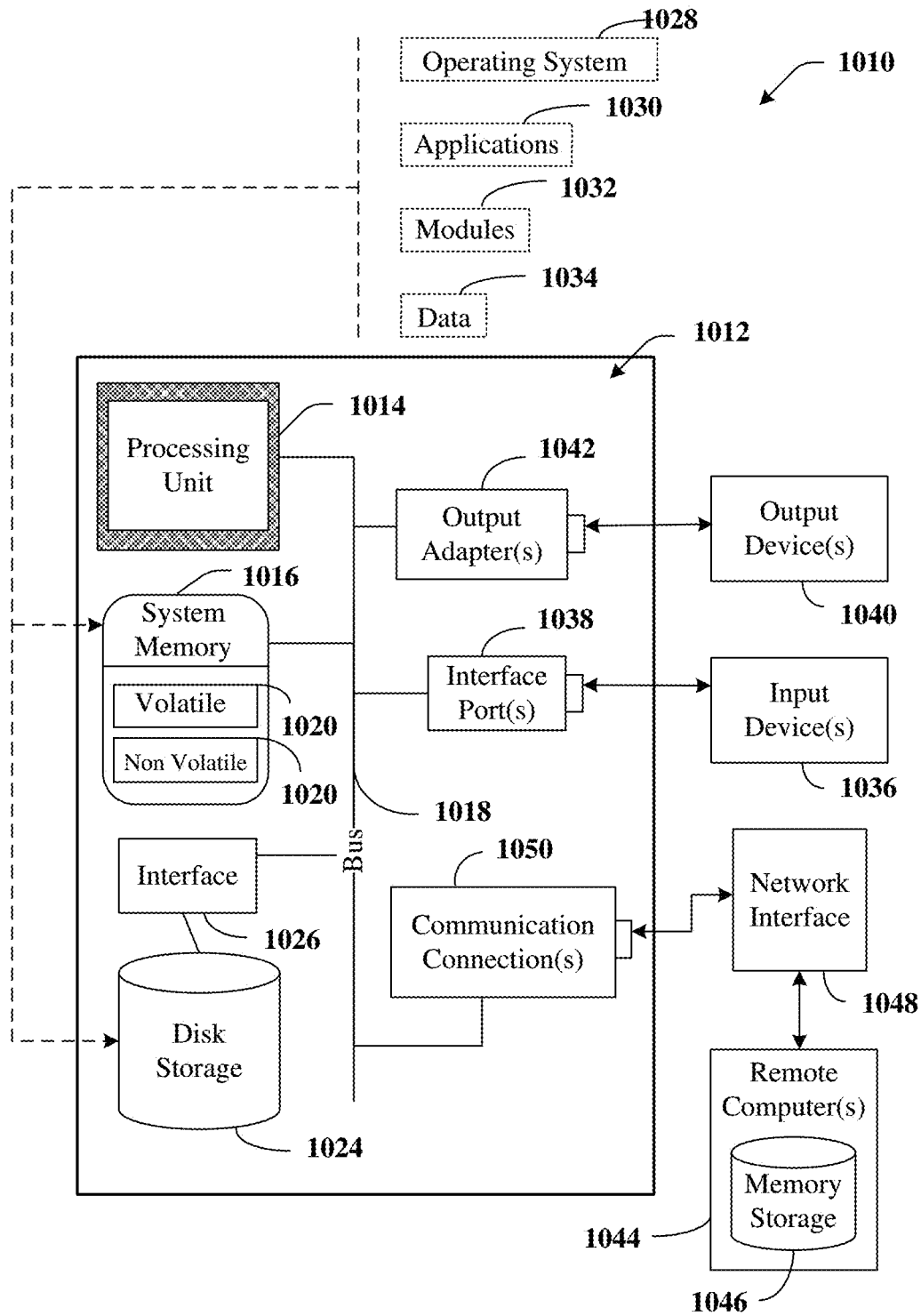
FIG. 10 illustrates an example, non-limiting, computing environment in which one or more embodiments described herein can be facilitated.
Figure 11:
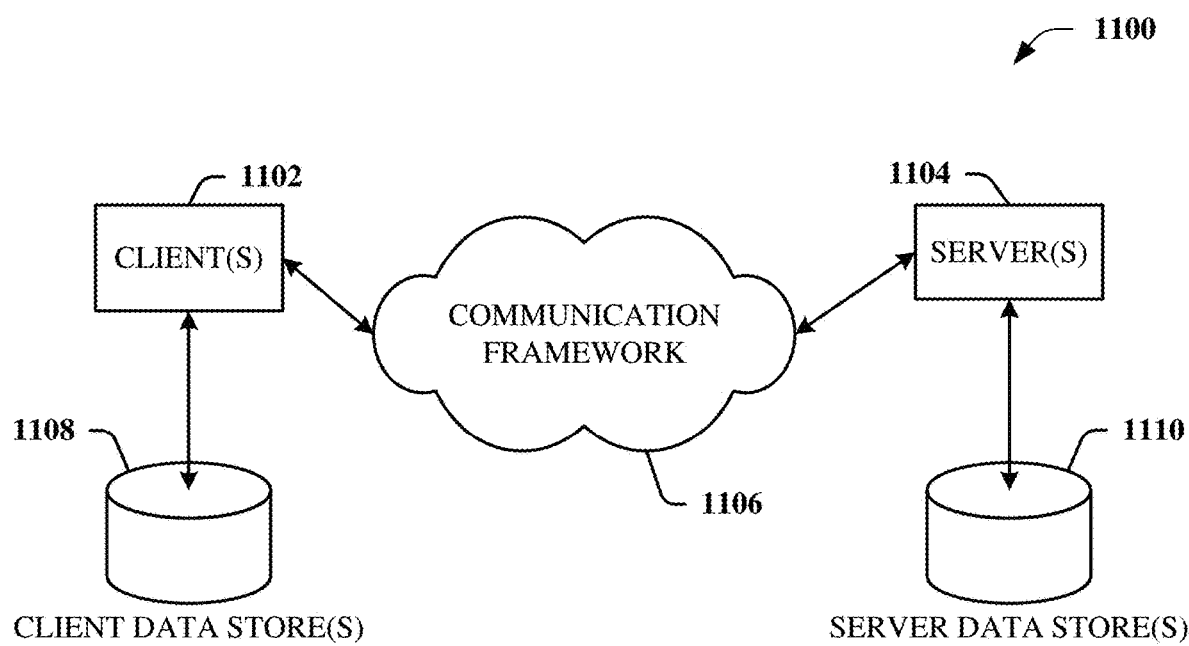
FIG. 11 illustrates an example, non-limiting, networking environment in which one or more embodiments described herein can be facilitated.

In order to provide a context for the various aspects of the disclosed subject matter, FIGS. 10 and 11 as well as the following discussion are intended to provide a brief, general description of a suitable environment in which the various aspects of the disclosed subject matter can be implemented.

With reference to FIG. 10, an example environment 1010 for implementing various aspects of the aforementioned subject matter includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Multi-core microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable PROM (EEPROM), or flash memory. Volatile memory 1020 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1012 also includes removable/non-removable, volatile/non-volatile computer storage media. FIG. 10 illustrates, for example a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1024 to the system bus 1018, a removable or non-removable interface is typically used such as interface 1026.

It is to be appreciated that FIG. 10 describes software that acts as an intermediary between users and the basic computer resources described in suitable operating environment 1010. Such software includes an operating system 1028. Operating system 1028, which can be stored on disk storage 1024, acts to control and allocate resources of the computer 1012. System applications 1030 take advantage of the management of resources by operating system 1028 through program modules 1032 and program data 1034 stored either in system memory 1016 or on disk storage 1024. It is to be appreciated that one or more embodiments of the subject disclosure can be implemented with various operating systems or combinations of operating systems.

A user enters commands or information into the computer 1012 through input device(s) 1036. Input devices 1036 include, but are not limited to, a pointing device such as a mouse, trackball, stylus, touchpad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port can be used to provide input to computer 1012, and to output information from computer 1012 to an output device 1040. Output adapters 1042 are provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the system bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

FIG. 11 is a schematic block diagram of a sample computing environment 1100 with which the disclosed subject matter can interact. The sample computing environment 1100 includes one or more client(s) 1102. The client(s) 1102 can be hardware and/or software (e.g., threads, processes, computing devices). The sample computing environment 1100 also includes one or more server(s) 1104. The server(s) 1104 can also be hardware and/or software (e.g., threads, processes, computing devices). The servers 1104 can house threads to perform transformations by employing one or more embodiments as described herein, for example. One possible communication between a client 1102 and servers 1104 can be in the form of a data packet adapted to be transmitted between two or more computer processes. The sample computing environment 1100 includes a communication framework 1106 that can be employed to facilitate communications between the client(s) 1102 and the server(s) 1104. The client(s) 1102 are operably connected to one or more client data store(s) 1108 that can be employed to store information local to the client(s) 1102. Similarly, the server(s) 1104 are operably connected to one or more server data store(s) 1110 that can be employed to store information local to the servers 1104.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," "manager," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable storage media can comprise, but are not limited to, Radon Access Memory (RAM), Read Only Memory (ROM), Electrically Erasable Programmable Read Only Memory (EEPROM), flash memory or other memory technology, Solid State Drive (SSD) or other solid-state storage technology, a magnetic storage device, e.g., hard disk; floppy disk; magnetic strip(s); an optical disk (e.g., Compact Disk (CD), a Digital Video Disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
   a memory that stores executable components; and
   a processor, operatively coupled to the memory, that executes the executable components, the executable components comprising:
   an identification manager component that identifies one or more elements of input data, wherein the input data comprises test data that comprises respective identifications of an input variable, an output variable, a test vector comprising an initial value of a test input, and an expected output variable against which test results are compared; and
   a template tool component that generates one or more executable scripts based on the input data that facilitate execution of tasks within different run-time environments that utilize different languages and syntax.

2. The system of claim 1, wherein the one or more executable scripts comprise a generic version of the test data.

3. The system of claim 1, wherein the one or more executable scripts are customizable for a defined test environment.

4. The system of claim 1, wherein the template tool component incorporates respective header information into the one or more executable scripts.

5. The system of claim 1, wherein the template tool component utilizes a template language syntax that comprises one or more fields for an entry of dynamic data determined as a function of a defined test environment.

6. The system of claim 1, wherein the template tool component determines a section of the test data to be repeated for test steps of the test data.

7. The system of claim 1, where the executable components further comprise a command component that determines one or more language specific commands for setting at least one input value to a defined value.

8. The system of claim 1, where the executable components further comprise a result determination component that evaluates a result of an implementation of the test data based on a comparison of the result against the expected output variable.

9. A method, comprising:
- identifying, by a system comprising a processor that executes instructions stored in memory, test data, wherein the test data comprises respective identifications of an input variable, an output variable, a test vector comprising an initial value of a test input, and an expected output variable against which test results are compared; and
- generating, by the system, one or more scripts based on the test data, wherein the one or more scripts facilitate execution of tasks within different run-time environments that utilize different languages and syntax.

10. The method of claim 9, wherein the one or more scripts comprise a generic version of the test data.

11. The method of claim 9, wherein the one or more scripts are customizable for a defined test environment.

12. The method of claim 9, wherein the identifying the test data comprises receiving the test data in a structured machine-readable format, an unstructured machine-readable format, or combinations thereof.

13. The method of claim 9, wherein the identifying the test data comprises identifying at least one of a tolerance, a timing information, a delay information, and a traceability information.

14. The method of claim 9, wherein the generating the one or more scripts comprises incorporating header information into the one or more scripts.

15. The method of claim 9, wherein the generating the one or more scripts comprises utilizing a template language syntax comprising one or more fields for an entry of dynamic data determined as a function of a defined test environment.

16. The method of claim 9, wherein the generating the one or more scripts comprises determining a section of the test data determined to be repeated for test steps of the test data.

17. The method of claim 9, further comprising:
- determining, by the system, language specific commands for setting an input to a defined value.

18. The method of claim 17, further comprising:
- evaluating, by the system, a result of implementation of the test data, wherein the evaluating comprises comparing the result of implementation of the test data against the expected output variable.

19. A computer readable storage device comprising executable instructions that, in response to execution, cause a system comprising a processor to perform operations, the operations comprising:
- receiving input data that comprises test data;
- identifying one or more elements within the test data, wherein one or more elements comprises at least one of an input variable, an output variable, a test vector comprising an initial value of a test input, and an expected output variable against which test results are compared; and
- generating one or more executable commands based on the test data, wherein the one or more executable commands facilitate execution of tasks within different run-time environments, wherein the different run-time environments comprise respective languages and respective syntax.

20. The computer readable storage device of claim 19, wherein the operations further comprise:
- receiving a result of an implementation of the one or more executable commands through a feedback loop;
- comparing the result of the implementation of the one or more executable commands output data against the expected output variable; and
- selectively modifying at least one parameter of the test data based on the result of the implementation being outside a defined tolerance of the expected output variable.

* * * * *